Aug. 9, 1960     I. W. ROTHROCK     2,948,312
MACHINE TO PREPARE PRECISELY THE EDGES OF SHEET
MATERIAL FOR VENEERING AND THE LIKE
Filed June 13, 1958     3 Sheets-Sheet 1
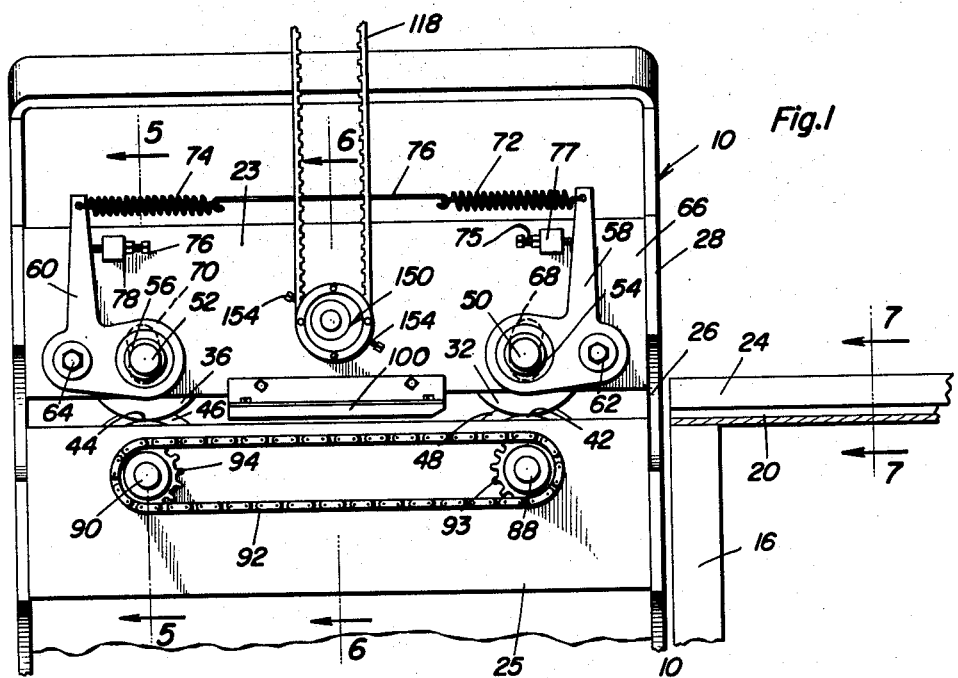
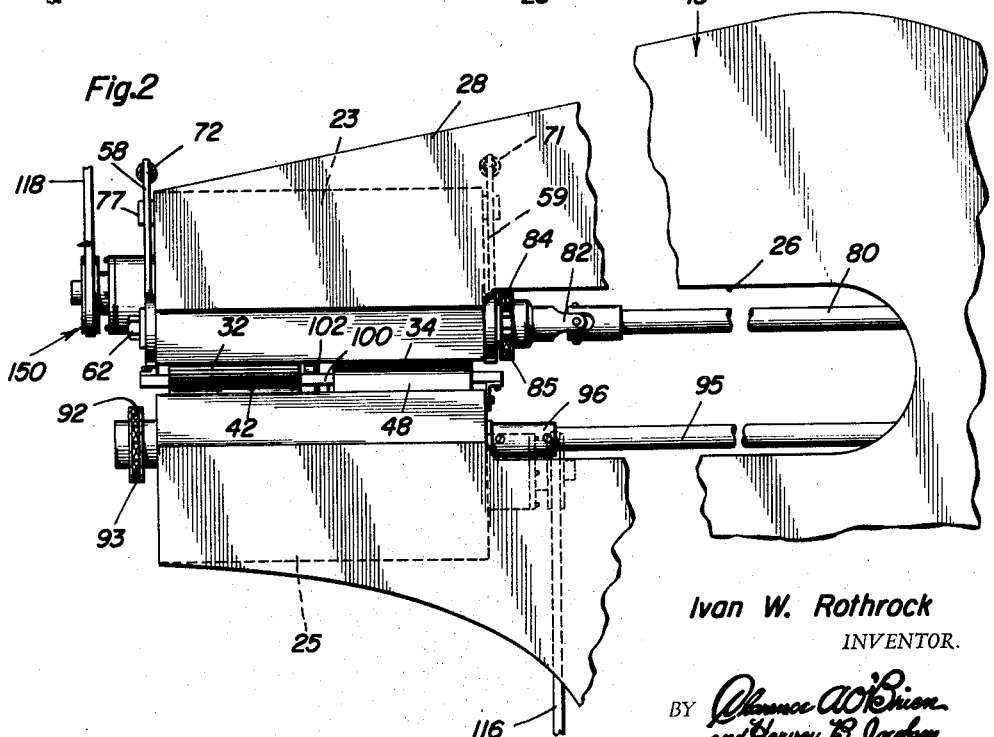
Ivan W. Rothrock
INVENTOR.

Aug. 9, 1960  I. W. ROTHROCK  2,948,312
MACHINE TO PREPARE PRECISELY THE EDGES OF SHEET
MATERIAL FOR VENEERING AND THE LIKE
Filed June 13, 1958  3 Sheets-Sheet 2

Ivan W. Rothrock
INVENTOR.

Aug. 9, 1960            I. W. ROTHROCK          2,948,312
MACHINE TO PREPARE PRECISELY THE EDGES OF SHEET
MATERIAL FOR VENEERING AND THE LIKE
Filed June 13, 1958                                      3 Sheets-Sheet 3

Ivan W. Rothrock
INVENTOR

BY *Clarence A. O'Brien*
*and Harvey B. Jacobson*
Attorneys

United States Patent Office 2,948,312
Patented Aug. 9, 1960

2,948,312

MACHINE TO PREPARE PRECISELY THE EDGES OF SHEET MATERIAL FOR VENEERING AND THE LIKE

Ivan W. Rothrock, 315 Hawthorne Ave., Eugene, Oreg.

Filed June 13, 1958, Ser. No. 741,778

4 Claims. (Cl. 143—55)

This invention relates to wood working machines and particularly to a machine that is designed as an attachment to be mounted on or in front of a taping machine or veneer splicer.

An object of the invention is to provide a machine for preparing and feeding prepared, matched sheets of material for the manufacture of plywood or for veneer processing. A machine constructed in accordance with the invention is equipped with feed rolls and motor driven saws with chip breakers mounted on a main frame. The machine functions as an attachment for a conventional plywood or veneer processing machine and is intended to eliminate one operation in plywood manufacture or veneer processing.

Sheets of wood stock are fed into feed rolls and the sheets overlap at different levels, one above the other. The saws are arranged in position to cut both overlapping edges back to an even center line thereby straightening and smoothing the edges for a matching joint. From this operation the sheets are pulled or moved to the same level and pass directly to the taping machine or edge gluing machine and are taped or glued together.

A further object of the invention is to provide a machine for preparing sheet material, ordinarily wood, prior to taping or gluing, the machine having upper and lower groups of rollers arranged to support the sheets with their edges overlapped and at different elevations. The machine has a pair of saws and chip removers to cut the overlapped parts of the sheets smooth and straight as the rollers propel the sheets through the machine.

An important feature of this machine is its structural organization. There are presser feet, one for each sheet, and these keep the sheets firmly pressed against the table of the machine and in the region that the saw blades and chip removers are operating. This feature eliminates chattering of the sheets enabling the saws and chip removers to function smoothly and effectively.

Another feature of the invention is found in the arrangement of rollers and their drive organization. The upper group of rollers is powered to operate in unison while the lower group of rollers is powered to operate together. This provides a live bed for the sheets, keeping them moving at a proper fixed speed in order to feed the sheets to the saws.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side view of a machine constructed in accordance with the invention.

Figure 2 is a front view of the machine of Figure 1, this being the infeed side thereof.

Figure 7:
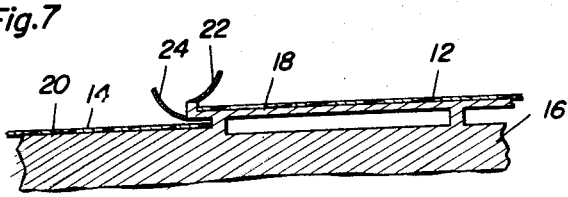
Figure 7 is a sectional view showing a suggested table to facilitate feeding the sheets into the machine, and taken on the line 7—7 of Figure 1.

In the accompanying drawings there is a machine 10 to prepare sheet material that is fed into a plywood taping or a veneer processing machine (unshown) of any manufacturer's make. The typical sheets 12 and 14 (Figures 4–7) are preferably fed into machine 10 with the aid of table 16 having an upper level 18 and a lower parallel level 20 (Figure 7). Guides 22 and 24 consisting of elongate curved plates, are attached to the table 16 at the confronting edges of the two levels 18 and 20. These function as stops to facilitate rapid placement of sheets 12 and 14 on the table for feeding into entrance 26 (Figures 1 and 4) of the main frame 28 of machine 10. Frame 28 is approximately C-shaped, having a throat with a part thereof constituting the sheet material entrance 26.

There is an upper group 30 of rollers, consisting of rollers 32, 34, 36 and 38, carried by the frame 23 of the rectangular frames 23 and 25 fastened to the main frame of the machine, and a lower group 40 of rollers consisting of rollers 40, 44, 46 and 48 respectively, carried by the other frame 25. The rollers of group 30 operate in unison while the rollers of group 40 operate in unison. Rollers 32 and 34 are on a single roller shaft 50 while rollers 36 and 38 are on a single roller shaft 52. Rollers 32 and 36 are larger than rollers 34 and 38, and they are driven by the shafts 50 and 52. The outer ends of shafts 50 and 52 are disposed in bearings 54 and 56 carried by bell cranks 58 and 60. The bell cranks are mounted on pivots 62 and 64, the pivots supported by wall 66 of frame 28 (Figure 1). This wall has slots 68 and 70 through which the ends of shafts 50 and 56 pass so that the shafts are capable of being lifted and lowered.

There are resilient means reacting on cranks 58 and 60 for pivoting bell cranks 58 and 60. These means consist of one or a pair of springs 72 and 74 attached to the ends of the bell cranks and to a connecting wire 76. The bias of springs 72 and 74 is in a direction tending to rotate the bell cranks 58 and 60 in a direction to move the shafts supporting group 30 of rollers downwardly toward the group 40 of rollers. Adjustable stops, for instance setscrews 75 and 76 in threaded blocks 77 and 78 on wall 66, contact bell cranks 58 and 60 to limit the extent of pivotal movement of the bell cranks.

A source of power, for instance an electric motor, (unshown) rotates drive shaft 80, and this shaft is attached to shaft 50 by a universal joint 82 or a correspondingly functioning coupling. Shafts 50 and 52 are coupled together for rotation by chain 84 that is entrained around sprockets 85 and 86 on shafts 50 and 52 respectively.

The lower group 40 of rollers are on two shafts 88 and 90 that are mounted for rotation in opposed walls of frame 25. Shafts 88 and 90, and hence the larger roller of each pair of rollers on each shaft, are coupled for uniform rotation by chain 92 that is engaged with sprockets 93 and 94 attached to shafts 88 and 90 respectively. Since the group 40 of rollers does not have to be vertically adjustable, the drive shaft 95 is connected to either of the two shafts, for instance shaft 88, by a rigid coupling 96 (Figure 2).

Upper rollers 34 and 38 are smaller than their companion rollers 48 and 46. On the other hand, upper rollers 32 and 36 are larger than their companion rollers 42 and 44. As a result the larger roller of each pair will have a greater peripheral speed than the smaller roller of each pair for a given shaft rotational speed. Therefore, only the larger rollers are driven with the smaller rollers being free turning. Sheets 12 and 14, then, will tend to be propelled over bed plate or table 100 which extends through the throat of frame 28 and on the opposite surface of which sheets 12 and 14 are pressed. There are two saws 102 and 104 attached to the opposing walls of frame 28. Each saw consists of a saw blade 103 and 105 respectively together with a chip remover 107 and 108 on one face of each blade. The blades and chip removers enter opening 114 in table 100 to provide ample cutting clearance when trimming the overlapped parts of the edges of typical sheets 110 and 112. The saw blades are on arbors in arbor housings 110 and 112 bolted or otherwise attached to the opposing walls of frame 28 and beneath the above table 100. Any conventional power drive can be used for the arbors, for instance electric motors (unshown) which drive through belt and pulley assemblies 116 and 118 respectively. As an alternative, the arbors and their drives could be replaced by combined arbor motors with the blades mounted directly on the motor shafts.

As the sheets are fed into the throat of the machine, the upper group 30 of rollers is elevated slightly against the yielding opposition of springs 72, 74 on one side of the machine and springs 72 and 74 coact with the bell cranks 58 and 60 to apply a yielding opposition to upward movement of shafts 50 and 52, while springs 71 and 73 react on identical bell cranks 59 and 61 that support the opposite end parts of shafts 50 and 52 in the manner identical to the supporting of these shafts by bell cranks 58 and 60. Although the bed for the sheets is live in the sense that the larger rollers are driven, the upper part of the bed is yieldingly pressed onto the surface of sheets 12 and 14 so that the machine can accommodate different thicknesses of sheets.

As the saws and chip removers perform their functions, the sheet will tend to chatter unless provision is made to prevent this. This is true to a larger or smaller extent depending on the type and thickness of sheets 12 and 14. Therefore, there is an upper pressure foot assembly 120 and a lower pressure foot assembly 122 (Figure 4) attached to the opposite sides of mounting brackets 124 and 126. Assembly 120 has a pressure plate 130 with an upturned front edge to facilitate guiding the sheet 12 between it and table 100. Four links 134 are pivoted to the upstanding flange (Figure 6) 138 of pressure plate 130 and are pivoted to the upper hanger 140 held stationary by bracket 124. Spring 142 is attached at its ends to the upper pivot connection of one of the links and the lower pivot connection of another of the links. With the links approaching but never reaching an overcenter position, spring 142 will continually apply a yielding force to the pressure plate 130 in a direction tending to rotate the pressure plate 130. However, the bottom surface of the plate is in contact with the sheet 12 and this force is expended in holding the sheet firmly pressed against table 100 and in the region of the saw 102. The lower pressure foot assembly 122 is identical in both construction and function to the pressure assembly 120, except that it operates vertically upward instead of vertically downward and presses the sheet 14 against the bottom surface of table 100 instead of the top surface thereof.

Figure 3:
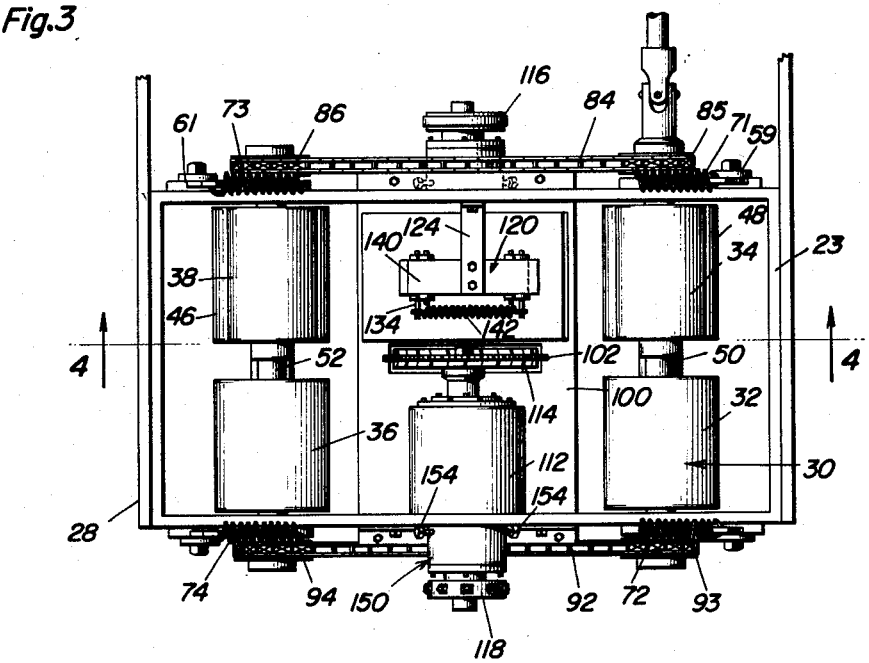
Figure 3 is a top view of the machine in Figure 1.
Figure 4:
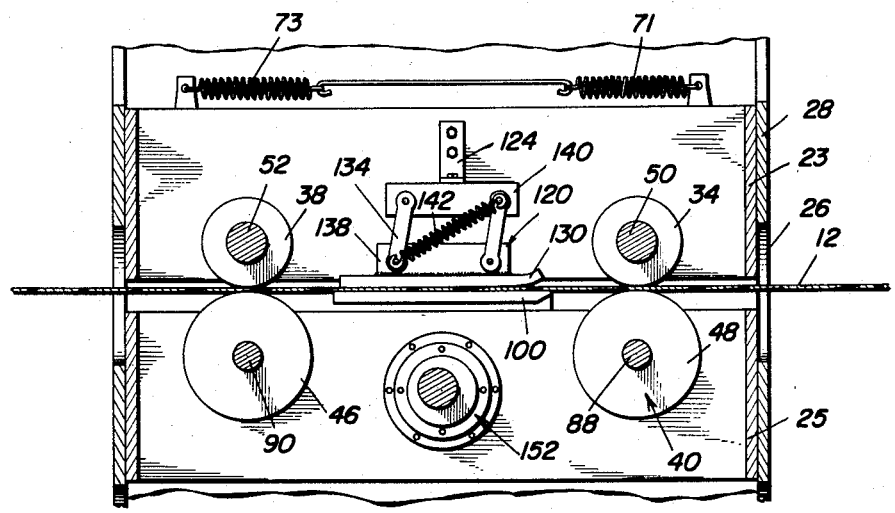
Figure 4 is a sectional view taken on the line 4—4 of Figure 3.
Figure 5:
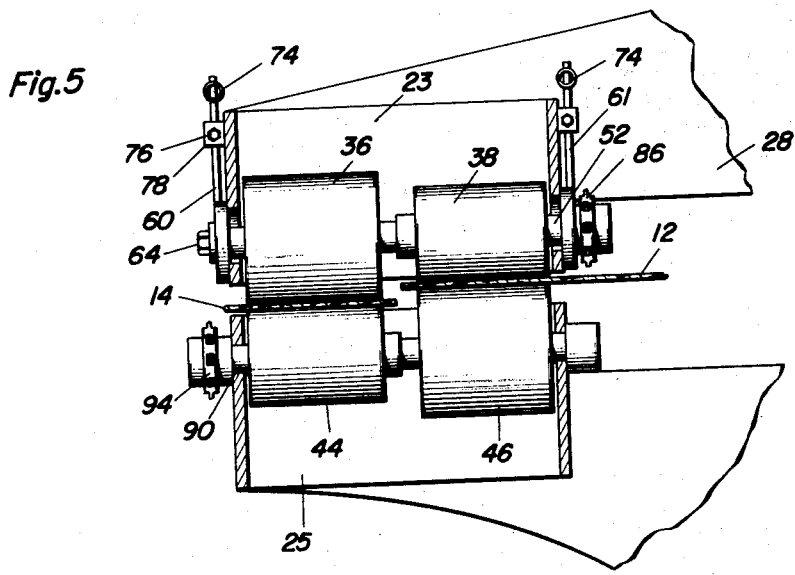
Figure 5 is a sectional view taken on the line 5—5 of Figure 1.
Figure 6:
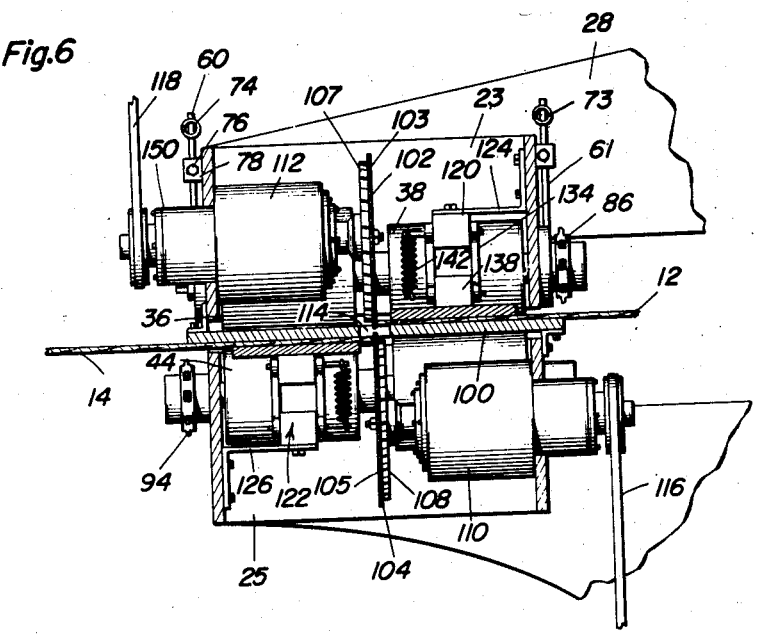
Figure 6 is a sectional view taken on the line 6—6 of Figure 1.

Inasmuch as the upper group of rollers is yieldingly supported not only to have a yielding application of pressure on the sheets 12 and 14, but also to allow for a variation in sheet thickness, provision is also made for adjusting the saws so that they, too, can be adjusted for most effective operation throughout a wide range of sheet thickness. The illustrated adjustment for the saw blades is seen in Figures 2 and 4 and consists of two eccentric assemblies 150 and 152 mounted in opposite sides of frame 25. The gear reducer power input shaft plus the entire gear reducers can be shifted vertically by rotating the eccentric in its mount and holding the eccentric in its mount (each assembly) by setscrews 154 that are threaded into the cylindrical eccentric mount. This is a comparatively slow adjustment and therefore it is within the purview of the invention to have a power adjustment, for example a feed screw, so that the saws can be very quickly adjusted toward and away from the bed plate 100. It has been found important to have the saws exceedingly close to the bed plate 100 when working with very thin sheets such as required in veneering. For other work, a different adjustment of the saws is more desirable.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A machine for preparing adjacent edges of sheet material for a sheet material taping or veneer processor, said machine comprising a main frame provided with an inlet throat to receive two sheets substantially edge to edge, a first upper frame and a second lower frame beneath said first frame, a lower group of rollers and shafts consisting of a pair of horizontally spaced parallel horizontal lower shafts carried by said second frame, a larger and a smaller friction roller on each shaft, an upper group of rollers and shafts consisting of two upper horizontal shafts and an upper larger and smaller friction roller on each of said upper shafts, the upper smaller rollers being directly vertically above said larger lower rollers and said upper larger rollers being located directly vertically above said smaller lower rollers, means movably connected to said first frame for mounting said upper shafts for up and down adjustment with respect to said lower shafts to thereby correspondingly move the rollers of said upper group to compensate for different thicknesses of sheets received in said throat and propelled by and between said rollers, an upper saw and a lower saw mounted between said shafts to simultaneously cut the adjacent edges of both sheets on the different levels established by the arrangement of larger and smaller rollers thereby preparing the adjacent edges of the sheets for subsequent exact registration with each other, a bed plate disposed between said upper shafts and in an approximately horizontal plane at the adjacent portions of the surfaces of said upper and lower rollers, a first upper pressure plate above a portion of said bed plate, yielding means pressing said upper pressure plate toward the top surface of said bed plate to bear against the upper surface of the upper sheet, a lower pressure plate beneath another portion of said bed plate, and resilient means biasing said second pressure plate toward the lower surface of said bed plate to bear against the lower surface of the other sheet on the lower surface of the bed plate.

2. The machine of claim 1, wherein said means movably connected to said first frame mounting said upper shafts for up and down adjustment include a pair of bell cranks pivoted to said first frame, spring means attached to one pair of ends of said bell cranks, and said upper shafts attached to the opposite ends of said bell cranks.

3. The machine of claim 1, wherein there are adjustable stops carried by said upper frame and in the path of pivotal motion of said upper shafts.

4. The machine of claim 1, wherein said bed plate has an opening therein, and means connected with said saws for adjusting said saws inwardly and outwardly of said bed plate opening.

References Cited in the file of this patent

UNITED STATES PATENTS

| | | |
|---|---|---|
| 395,526 | Totman | Jan. 1, 1889 |
| 661,552 | Rich et al. | Nov. 13, 1900 |
| 684,764 | Cunningham | Oct. 15, 1901 |
| 833,858 | Thomas | Oct. 23, 1906 |
| 932,373 | Burns et al. | Aug. 24, 1909 |
| 1,162,538 | Yaukey | Nov. 30, 1915 |
| 1,582,027 | Dunbar | Apr. 27, 1926 |
| 2,102,186 | Nicholson et al. | Dec. 14, 1937 |
| 2,312,439 | Peterson | Mar. 2, 1943 |
| 2,779,363 | Laughton | Jan. 29, 1957 |